Patented Sept. 12, 1939

2,172,691

UNITED STATES PATENT OFFICE 2,172,691

AZO DYESTUFFS

Hans Roos, Leverkusen-I. G. Werk, Germany, assignor to General Aniline Works, Inc., New York, N. Y., a corporation of Delaware No Drawing. Application December 29, 1936, Serial No. 118,121. In Great Britain August 2, 1934

4 Claims. (Cl. 260—160)

The present invention relates to new azo dyestuffs, more particularly it relates to azo dyestuffs which may be represented by the general formula: $R_3-N=N-R_1-CO-NH-R-N=N-R_2$
In the said formula $-NH-R-N=$ stands for the radical of a meta or para diamine of the benzene series, $R_1$ stands for a radical of the benzene series, $R_2$ stands for the radical of a non-diazotizable yellow component of the group consisting of aromatic ortho-hydroxy-carboxylic acids and 1-aryl-5-pyrazolone-3-carboxylic acids, such as salicylic acid, cresotinic acids, 1-phenyl- (or tolyl-, or sulfo-phenyl, or chlorophenyl)-5-pyrazolone-3-carboxylic acid, and $R_3$ stands for the radical of an aminoaroylated aminonaphtholsulfonic acid, such as 2-aminoaroylamino-5-naphthol-7-sulfonic acid, 2-aminoaroylamino-8-naphthol-6-sulfonic acid or 1-aminoaroylamino-8-naphthol-3.6-disulfonic acid.

My new dyestuffs are obtainable by diazotizing a nitroaroyl-meta- or para-arylenediamine, coupling with one equimolecular proportion of a non-diazotizable yellow component of the group consisting of aromatic ortho-hydroxy-carboxylic acids and 1-aryl-5-pyrazolone-3-carboxylic acids, reducing the nitro group to the amino group, diazotizing and coupling with one equimolecular proportion of an N-aminoaroylaminonaphtholsulfonic acid.

In order to obtain the monoazo dyestuff which is formed as an intermediate product, it is, of course, also possible not to start from a nitroaroyl-meta or para-diamine, but instead first to couple a diazotized nitroaryl amine with one of the yellow components mentioned in the first coupling process, to reduce the nitro group of the monoazo dyestuff and to condense the amino group thus formed with a nitroaroyl chloride.

In form of their alkali metal salts my new dyestuffs are generally orange to red powders. In general they dye the vegetable fiber orange to red shades which are easily dischargeable in the neutral or alkaline process; they can be diazotized and further developed in the known manner, either in substance or on the fiber. The dischargeability of the dyestuffs after-treated in the said manner is maintained.

The invention is illustrated by the following examples without being limited thereto:

Example 1

25.7 parts of para-nitrobenzoyl-para-phenylenediamine are suspended in 1000 parts of water and 28 parts by volume of 10-N-hydrochloric acid solution, and diazotized with 7 parts of sodium nitrite. The diazo compound is cooled to 0° C. and introduced into a solution of 20.5 parts of 1-phenyl-5-pyrazolone-3-carboxylic acid to which 28 parts of crystalline sodium carbonate have been added, the temperature of the said solution being also 0° C. The temperature of the mixture is then maintained for some hours at 0° C. until the coupling is complete. The mixture is then heated to 70° C., whereupon a concentrated solution of 42 parts of sodium sulfide is added. The temperature is then maintained for about one hour while stirring. The aminobenzoylated monoazo dyestuff is separated by the addition of about 10% of common salt. The dyestuff is then dissolved in 2000 parts of hot water, 7 parts of sodium nitrite are added, and the whole is introduced into a mixture of ice, water and 35 parts of hydrochloric acid of 19.5° Bé. After about one hour's stirring, the diazotization is complete, whereupon a solution is added from 37 parts of 2-(para-aminobenzoylamino)-5-hydroxynaphthalene-7-sulfonic acid. Coupling is completed by introducing 25 parts of caustic soda lye. After developing on the fiber with β-naphthol there is obtained a yellowish-red of an excellent dischargeability.

The dyestuff corresponds in the free state to the following formula:

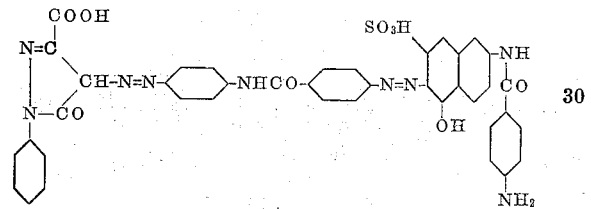

If instead of the 2-(para-aminobenzoylamino)-5-hydroxynaphthalene-7-sulfonic acid there is used the 2-(methyl-para-aminobenzoylamino)-5-hydroxynaphthalene-7-sulfonic acid, a dyestuff is obtained of similar properties but of shades which are somewhat more yellowish and clearer.

Example 2

28 parts of the monoazodyestuff prepared in the known manner either by diazotizing paranitraniline, coupling with salicylic acid and subsequent reduction, or by diazotizing acetyl-paraphenylenediamine, coupling with salicylic acid and subsequent saponification, are dissolved in about 500 parts of water. The temperature is then raised to 70–71° C. and, while maintaining the solution alkaline, para-nitrobenzoylchloride is continuously added until a test portion taken from from the mixture is no longer diazotizable. The precipitated condensation product is then reduced in the manner described in Example 1 with sodium sulfide, diazotized and coupled with 37 parts of 2-(para-aminobenzoylamino)-5-hydroxynaphthalene-7-sulfonic acid.

The dyestuff thus obtained, which corresponds in the free state to the following formula:

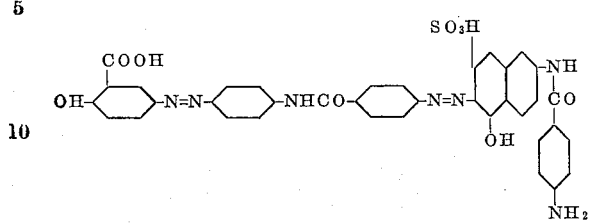

is similar to the dyestuff described in Example 1. When developed with β-naphthol on the fiber, there are obtained dyeings, which are somewhat more yellow and faster to light.

If the 2-(para-aminobenzoylamino)-5-hydroxynaphthalene-7-sulfonic acid is replaced by the 2-(methyl-para-aminobenzoylamino)-5-hydroxynaphthalene-7-sulfonic acid, there is obtained a dyestuff of the same properties, but which is of somewhat more yellow and clearer shade.

If in the dyestuff described in paragraph 1, in the manufacture of the aminoazo compound prepared from para-nitraniline salicylic acid, a mixture from salicylic acid and ortho-cresotinic acid is used, there is obtained a dyestuff which is somewhat more readily soluble.

*Example 3*

25.7 parts of para-nitrobenzoyl-para-phenylenediamine are suspended in 1 litre of water and 28 ccs. of 10 n-hydrochloric acid, and diazotized with 7 parts of sodium nitrite. The obtained diazo compound is then coupled in a soda-alkaline medium with 39 parts of 1-(6'-sulfo-2'-naphthyl)-5-pyrazolone-3-carboxylic acid ester. After coupling is complete, there is heated to 70° C., 32 parts of sodium sulfide, dissolved in a small quantity of water, are added, and the mixture is stirred for an hour while maintaining the temperature of 70° C. By the addition of nearly 10% of salt the aminobenzoylated monoazo dyestuff is isolated. The same is dissolved in 2 litres of hot water, to this solution there are added 7 parts of nitrite, then the same is poured to a mixture prepared from ice, water and 35 ccs. of hydrochloric acid of 19.5° Bé. After stirring for an hour diazotization is complete, whereup there is added a soda-alkaline aqueous solution prepared from 37 parts of 2-(meta-aminobenzoylamino)-5-hydroxynaphthalene-7-sulfonic acid.

A dyestuff is thus obtained which dyes cotton scarlet-red shades and which can be developed after diazotization on the fibre with β-naphthol to somewhat more blue dyeings of an increased fastness to washing.

The dyestuff corresponds in the free state to the following formula:

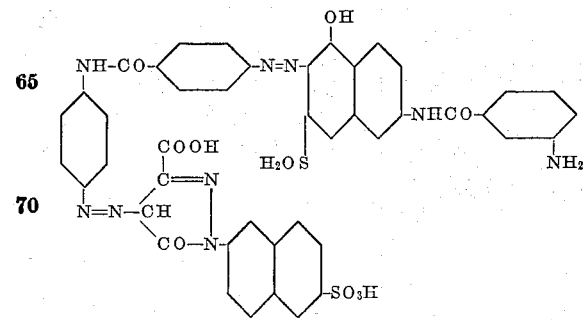

If the 2-(meta-aminobenzoylamino)-5-hydroxynaphthalene-7-sulfonic acid is replaced by the 2-(methylmeta-aminobenzoylamino)-5-hydroxynaphthalene-7-sulfonic acid, there is obtained a dyestuff of the same properties, but yielding somewhat more yellow and clearer shades. If the 2-(meta-aminobenzoylamino)-5-hydroxynaphthalene-7-sulfonic acid is replaced by the 2-(para-aminobenzoylamino)-8-hydroxynaphthalene-6-sulfonic acid, there is obtained a dyestuff of similar properties, but yielding more reddish shades.

This application and my prior application Ser. No. 25,181 filed June 5, 1935, contain related subject matter.

I claim:

1. Azo dyestuffs of the general formula: $R_3$—N=N—$R_1$—CO—NH—R—N=N—$R_2$, wherein —NH—R—N= stands for the radical of a meta or para diamino benzene, $R_1$ for a benzene radical, $R_2$ stands for the radical of a non-diazotizable yellow component of the group consisting of ortho-hydroxy-benzene-carboxylic acids and 1-aryl-5-pyrazolone-3-carboxylic acids, and $R_3$ stands for the radical of an aminoaroylated aminonaphthal-sulfonic acid, dyeing the vegetable fibre orange to red shades of good dischargeability, both in the neutral or alkaline process.

2. The dyestuffs of the general formula:

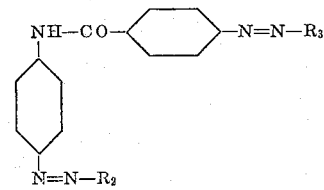

wherein $R_2$ stands for the radical of a non-diazotizable yellow component of the group consisting of ortho-hydroxybenzene-carboxylic acids and 1-aryl-5-pyrazolone-3-carboxylic acids, and $R_3$ for the radical of a 2-(aminobenzoylated)-5-hydroxynaphthalene-7-sulfonic acid, dyeing the vegetable fibre scarlet-red shades, and which can be developed after diazotization on the fibre with β-naphthol to somewhat more blue dyeings of an increased fastness to washing.

3. The dyestuff having in the free state the following formula:

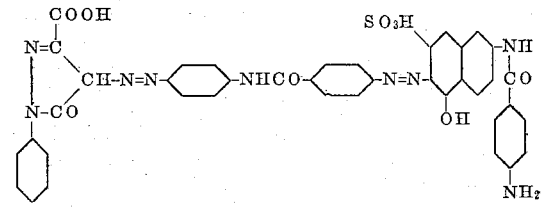

dyeing the vegetable fibre yellowish-red shades of good dischargeability.

4. The dyestuff having in the free state the following formula:

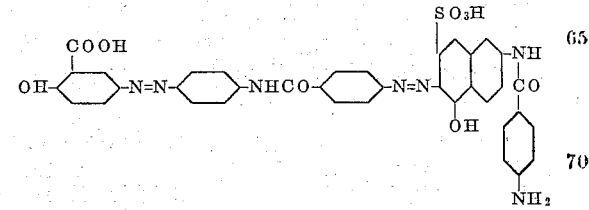

dyeing the vegetable fibre yellowish-red shades of good fastness to light.

HANS ROOS.